(12) United States Patent
Gierling

(10) Patent No.: US 6,595,896 B1
(45) Date of Patent: Jul. 22, 2003

(54) METHOD FOR MONITORING A CONTINUOUSLY VARIABLE TRANSMISSION

(75) Inventor: Armin Gierling, Langenargen (DE)

(73) Assignee: ZF Batavia L.L.C., Batavia, OH (US)

(*) Notice: Subject to any disclaimer, the term of this patent is extended or adjusted under 35 U.S.C. 154(b) by 0 days.

(21) Appl. No.: 09/857,595

(22) PCT Filed: Dec. 13, 1999

(86) PCT No.: PCT/EP99/09859

§ 371 (c)(1),
(2), (4) Date: Jun. 7, 2001

(87) PCT Pub. No.: WO00/35703

PCT Pub. Date: Jun. 22, 2000

(30) Foreign Application Priority Data

Dec. 17, 1998 (DE) .......................... 198 58 263

(51) Int. Cl.⁷ .............................................. B60K 41/12
(52) U.S. Cl. ............................................ 477/39; 477/45
(58) Field of Search ............................. 477/39, 41, 45, 477/46, 47, 91, 110, 175

(56) References Cited

U.S. PATENT DOCUMENTS

| | | | |
|---|---|---|---|
| 4,660,440 A | | 4/1987 | Matsumura et al. |
| 4,698,764 A | | 10/1987 | Inagaki et al. |
| 4,982,822 A | * | 1/1991 | Petzold et al. .............. 477/39 X |
| 5,007,512 A | * | 4/1991 | Petzold .................... 477/39 X |
| 5,042,325 A | | 8/1991 | Sawasaki et al. |
| 5,168,975 A | * | 12/1992 | Bernhardt et al. ........ 192/0.096 |
| 5,191,815 A | | 3/1993 | Kouta |
| 5,207,617 A | * | 5/1993 | Kato et al. ................. 477/41 X |
| 5,259,272 A | | 11/1993 | Yamamoto et al. |
| 5,611,372 A | | 3/1997 | Bauer et al. |
| 5,653,659 A | * | 8/1997 | Kunibe et al. ............... 477/111 |
| 5,871,416 A | * | 2/1999 | Sawada et al. ................ 477/47 |
| 5,961,408 A | | 10/1999 | König et al. |
| 6,050,917 A | * | 4/2000 | Gierling et al. ............... 477/45 |
| 6,168,546 B1 | * | 1/2001 | Loffler et al. ........... 477/111 X |
| 6,224,509 B1 | * | 5/2001 | Gierling ..................... 477/45 |
| 6,406,402 B1 | * | 6/2002 | Eguchi et al. ................ 477/45 |

FOREIGN PATENT DOCUMENTS

| | | | |
|---|---|---|---|
| DE | 38 01 845 A1 | 8/1989 | .......... B60K/41/14 |
| DE | 40 21 520 A1 | 1/1991 | .......... B60K/41/14 |
| DE | 44 36 506 A1 | 4/1996 | .......... F16H/59/06 |
| EP | 0 228 884 A1 | 7/1987 | .......... F16H/11/06 |

OTHER PUBLICATIONS

Japanese Abstract, vol. 014, No. 033 (M–293) dated Jan. 22, 1990 & JP 01 269620 A to Mazda Motor Corp, Oct. 27, 1989.

Japanese Abstract, No. 08085369A dated Apr. 2, 1996 to Suzuki Motor Corp.

* cited by examiner

Primary Examiner—Rodney H. Bonck
Assistant Examiner—Roger Pang
(74) Attorney, Agent, or Firm—Davis & Bujold, P.L.L.C.

(57) ABSTRACT

The method for monitoring the system pressure of a continuously variable transmission for motor vehicles which, via a permanent mechanical connection, is connected with the prime mover of the motor vehicle consists in that a warning signal is activated for the driver when a drop in system pressure is detected, an entry is made in the transmission fault memory, the clutch on the output side is opened, a signal is sent to the electronic engine control system to prevent uncontrolled acceleration of the engine and the vehicle speed is monitored until it falls below a preset threshold value after which the engine is switched off.

1 Claim, 3 Drawing Sheets

METHOD FOR MONITORING A CONTINUOUSLY VARIABLE TRANSMISSION

FIELD OF THE INVENTION

Figure 1:
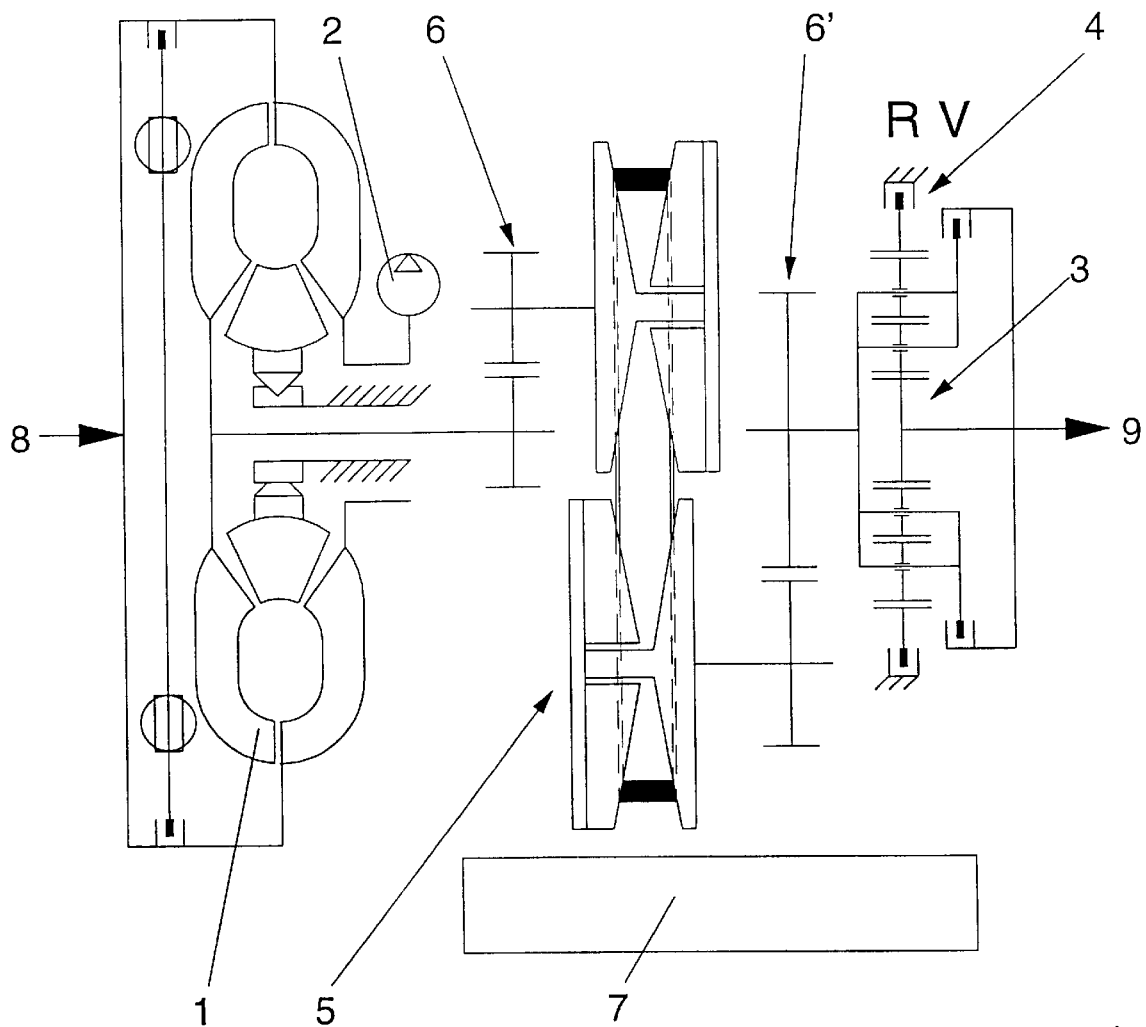

This invention relates to a method for monitoring the system pressure of a continuously variable transmission (CVT) for motor vehicles which is connected on one side, via a permanent mechanical connection, with the prime mover of a motor vehicle and, on the other side, via an output line, with the gears of a motor vehicle by means of the electronic control.

BACKGROUND OF THE INVENTION

Continuously variable transmissions, also called CVTs, have a variator for ratio adjustment; known structural shapes are toroid and belt-drive variators, for example. A belt-drive variator has a first cone pulley pair upon an input shaft and a second cone pulley pair upon an output shaft. Each cone pulley pair consists of a first pulley stationary in an axial direction and a second cone pulley movable in an axial direction, also respectively called primary pulley and secondary pulley. A belt-drive organ, such as a pushing link band, rotates between the cone pulley pairs. The primary pulley and secondary pulley are adjusted by a pressure medium. To this end, the electronic transmission control regulates the pressure level of the adjustment spaces of the primary pulley and secondary pulley, via electromagnetic actuators and hydraulic valves.

The orderly operation of a CVT is often monitored by the electronic transmission control. It is known from EP B 228 884 to monitor the orderly operation of two rotational speed sensors which are associated with the primary and secondary cone pulley pairs, it being tested whether or not the rotational speed signal is present. In the absence of the rotational speed of the secondary cone pulley pair, the reduction ratio can be controlled by the electronic transmission control to a fail-safe value. In case of absence of the rotational speed of the primary cone pulley pair, the rotational speed of the primary cone pulley pair is also controlled to a fail-safe value.

From DE A 44 36 506, a device for control of a CVT is further known which, via an input shaft, is connected with an input unit which can be a brake prime mover or an electromotor. The CVT has a hydrodynamic converter with lock-up clutch, a reversing set, a first cone pulley pair, a second cone pulley pair, a belt-drive organ and a hydraulic control device. The input shaft drives the hydrodynamic converter which consists of an impeller, a turbine wheel and a stator. A lock-up clutch is associated with the hydrodynamic converter. The turbine wheel and the converter lock-up clutch are connected with a transmission input shaft. The input shaft of the transmission drives the reversing gear set through which the rotational speed of the transmission input shaft can be directly transmitted to the first cone pulley pair or the direction of rotation can be reversed for reverse gear.

The CVT is controlled by the electronic transmission control by means of electromagnetic actuators and hydraulic valves which regulate the clutches and brakes and the respective pressure curves thereof. The electromagnetic actuators and hydraulic valves are relocated in the hydraulic valves which regulate the clutches and brakes and the respective pressure curves thereof. The electromagnetic actuators and hydraulic valves are located in the hydraulic control devices; a multiplicity of monitoring signals are fed to the electronic transmission control, for example, the load position of the input unit, the rotational speed of the transmission input shaft, the rotational speed of the output shaft and the temperature of the pressure medium. For the case of failure of the electronic control device, the known device is provided with an emergency device by means of which a constant pressure ratio between the primary pulley and the secondary pulley is adjusted. Instead of a hydrodynamic converter between the prime mover and CVT, there can also be used a rigid mechanical connection or a mechanical connection damped by torsional vibration technology, by means of a shaft, torsional shock absorber, double solid fly wheel, etc. Since the reversing gear set is situated with positive engagement closing clutches for forward and reverse gears between the converter and the variator, no permanent connection of the variator with the engine exists in the described arrangement.

In another known CVT design, the variator is situated directly behind the torsional vibration damper of the prime mover, the positive engagement closing clutch lying upon the transmission output side. Therefore in this arrangement, a permanent mechanical connection of the variator with the engine does exist which can have a detrimental effect in case of a mechanical damage of the transmission.

The problem to be solved by this invention is to provide a method for monitoring the system pressure of a continuously variable transmission for motor vehicles which has a permanent mechanical coupling between engine and transmission and which, in the occurrence of mechanical damage and drop of system pressure determined thereby, takes care of switching off the engine while, at the same time, the vehicle is under the driver's command.

On the basis of a method of the kind mentioned in detail above, this problem is solved.

SUMMARY OF THE INVENTION

The inventive method consists in that the system pressure in the CVT is continuously monitored, that upon detection of a system pressure drop in the CVT, a warning signal for the driver is activated and an entry is made in the transmission fault memory that the clutch on the output side is open, that by an electric connection of the electronic engine control, a signal is communicated for preventing an uncontrolled acceleration of the vehicle and that the vehicle speed is monitored until it falls below a preset threshold value after which the engine is switched off.

The inventive method therefore prevents the occurrence of capital secondary damages in the transmission in case of drop of the system pressure due to simple mechanical damages during an inadmissibly long operation. The method is implemented by the electronic transmission control which communicates with the electronic engine control, via an electric connection for example, via cable or the data bus (CAN coupling).

After a system pressure drop has been detected, the flow of power between engine and output line is interrupted and the CVT is uncoupled from the gears. By the simultaneous communication to the electronic engine control, the otherwise possible uncontrolled acceleration of the engine can be eliminated. After opening the clutch on the output side, the engine must be switched off as soon as possible. The assessment of the vehicle speed upon detection of the system pressure drop ensures the control of the vehicle by the driver by maintaining the engine support of brake and steering system.

The inventive method is also adequate for other mechanical errors in the CVT during which, after detection of a system pressure drop, a further rotation of the transmission inner parts must be prevented.

BRIEF DESCRIPTION OF THE DRAWING(S)

The invention is explained, in detail, with reference to the drawings which shows:

FIG. 1 a transmission diagram of a CVT with hydrodynamic converter; and

Figure 2:
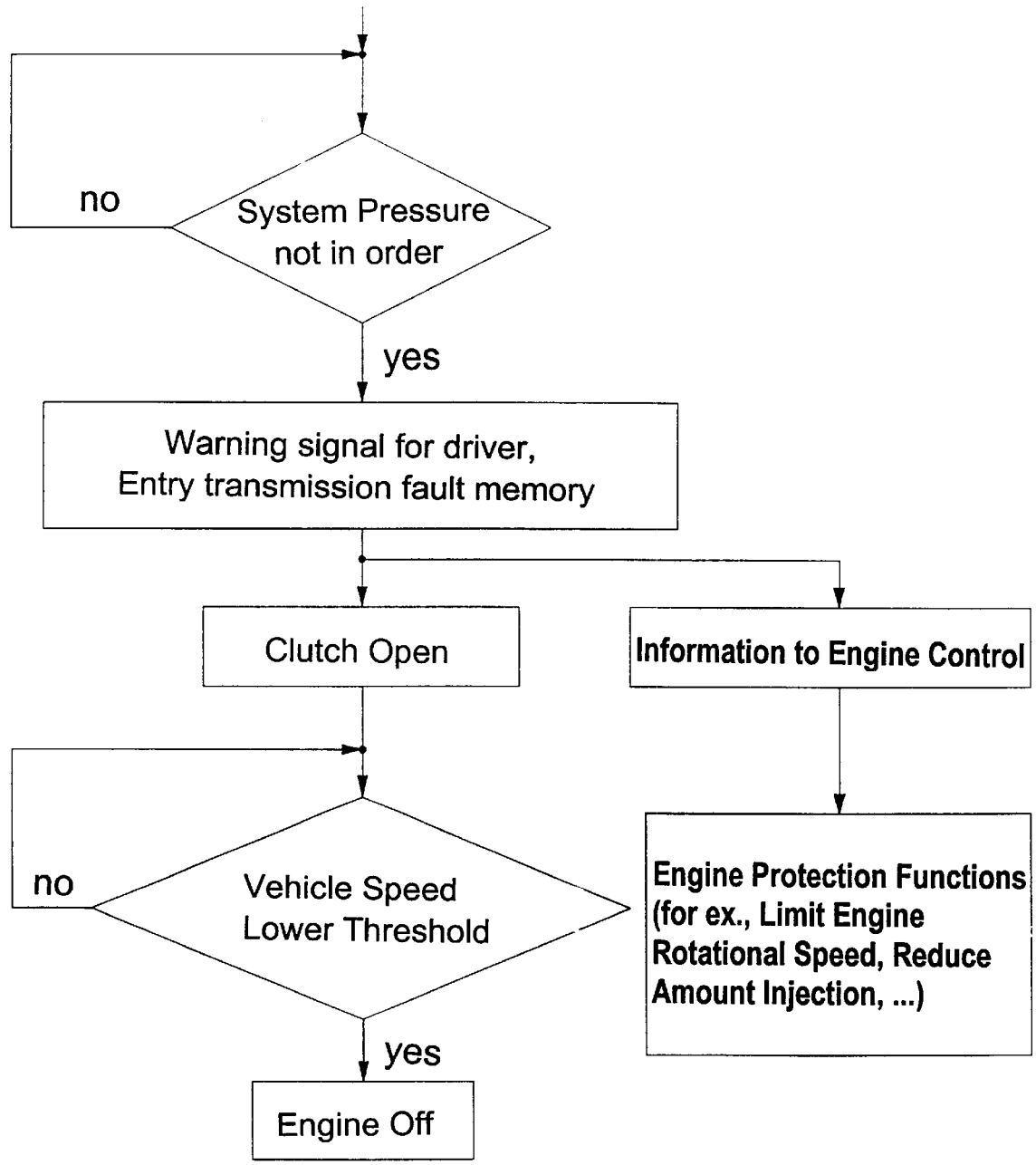

FIG. 2 an operation diagram for the inventive method.

Figure 3:
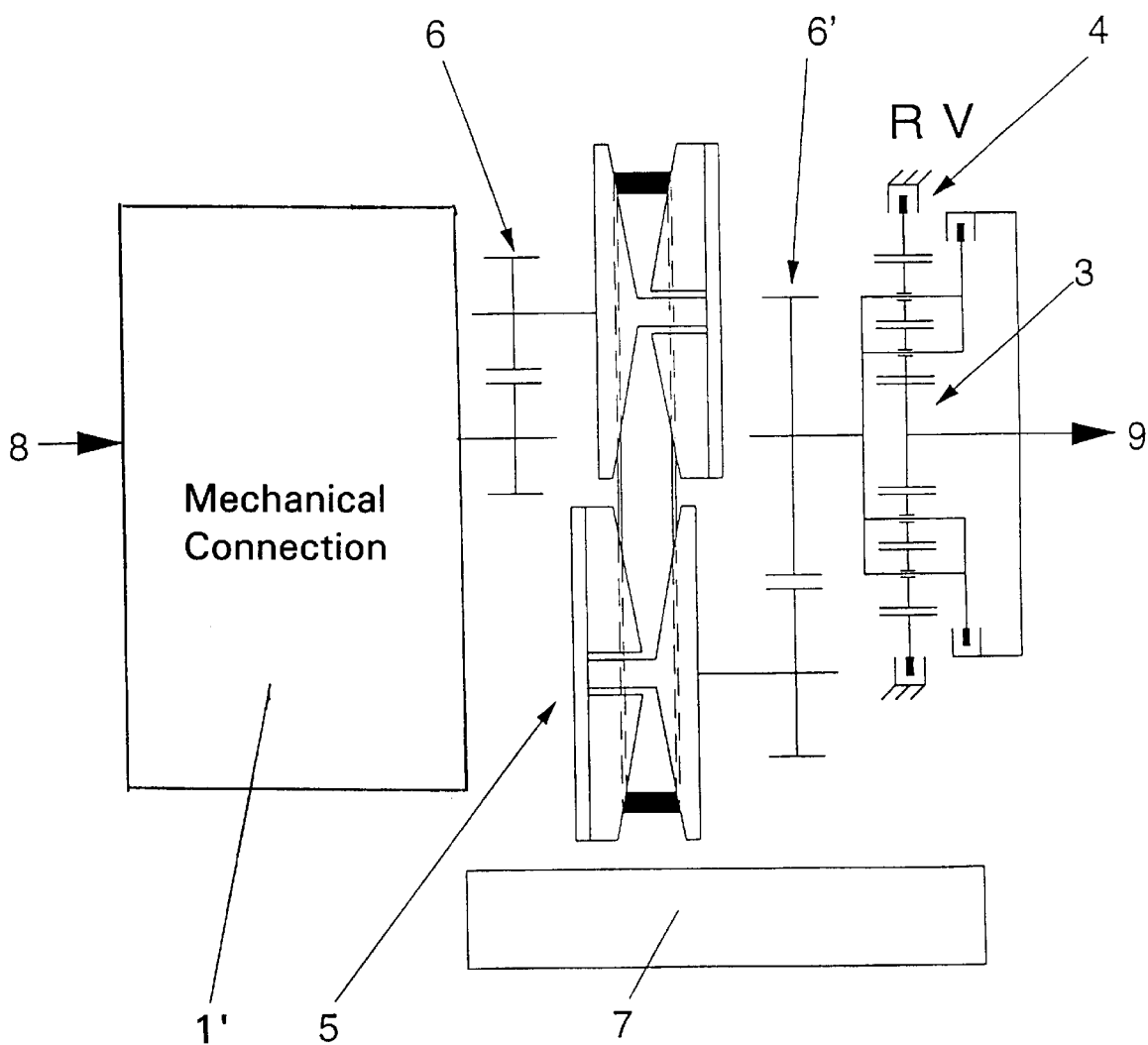

FIG. 3 a transmission diagram of a CVT without hydrodynamic converter.

DETAILED DESCRIPTION OF THE INVENTION

In FIG. 1 is shown the transmission diagram of a CVT which is connected on one side, via an input shaft 8, with the prime mover such as an internal combustion engine of a motor vehicle and, on the other side, via an output line 9, with the gears of the motor vehicle. This CVT has a hydrodynamic converter 1 in the usual manner with a lock-up clutch, an impeller, a turbine wheel and a stator. A pump 2 is directly driven by the converter impeller. Fitted downstream of the hydrodynamic converter 1 is a constant ratio 6 through which the rotational speed of the input shaft is transmitted to the first cone pulley pair of a variator designated with 5. The cone pulley pair is connected via a belt-drive organ shown in dotted lines with a second cone pulley pair. The second cone pulley pair of the variator 5 is connected with one other constant ratio 6' with which is associated a reversing set 3 with shifting elements 4 for forward and reverse gears V, R. The reversing gear set 3 is connected with the output line 9. The hydraulic control of the CVT is designated with 7.

If the CVT now is not connected with a hydrodynamic converter, as shown in FIG. 1, but with the prime mover of the motor vehicle via a rigid mechanical connection or also a mechanical connection damped by torsional vibration technique, that is, by means of shafts, torsional shock absorbers, double solid fly wheels, etc. so that a permanent mechanical connection 1' of the variator with the engine exists, then, in case of a transmission damage, the permanent coupling engine/variator can be critical. Simple mechanical damages can already result in capital subsequential damages due to further rotation of the parts in the CVT.

To prevent this, it is provided that the electronic transmission control (not shown) for the CVT continuously monitors the system pressure in the CVT according to the invention. If a system pressure drop now occurs, it is detected by adequate sensor systems whereupon the electronic transmission control activates a warning signal for the driver and effects an entry in the transmission fault memory. With a signal issued subsequently or simultaneously by the electronic transmission control, the clutch on the output side opens and via an electric connection between electronic transmission control and electronic engine control, information is simultaneously sent to the latter which sets in motion the engine protection operations such as the limitation of the engine rotational speed, the removal of the injected amount, etc., in order to prevent an uncontrolled acceleration of the engine.

The motor vehicle speed is simultaneously monitored until the speed falls below a preset threshold value after which the engine is switched off. This assessment of the vehicle speed upon the detection of a system pressure drop ensures the control of the vehicle by the driver by maintaining the engine support of brake and steering system.

What is claimed is:

1. A method for monitoring a system pressure of a continuously variable transmission (CVT) for a motor vehicle which is connected on one side, via a permanent mechanical connection, with an engine of the vehicle and on the other side, via an output line, with gears of the motor vehicle, the method comprising the steps of:

a) monitoring continuously the system pressure in the CVT;

b) communicating to an operator of said motor vehicle a system pressure drop;

c) entering a system pressure drop in a transmission fault memory;

d) opening a clutch on an output side;

e) communicating to an electronic engine control a signal to prevent an uncontrolled acceleration of the engine; and f) monitoring a vehicle speed until it falls below a preset threshold value after which the engine is switched off.

* * * * *